(12) United States Patent
Kasztenny et al.

(10) Patent No.: US 8,649,142 B2
(45) Date of Patent: *Feb. 11, 2014

(54) EQUIVALENT ALPHA PLANE FAULT DETERMINATION FOR A MULTI-TERMINAL POWER APPARATUS

(75) Inventors: Bogdan Z. Kasztenny, Markham (CA); Normann Fischer, Cotex, WA (US)

(73) Assignee: Schweitzer Engineering Laboratories Inc, Pullman, WA (US)

(*) Notice: Subject to any disclaimer, the term of this patent is extended or adjusted under 35 U.S.C. 154(b) by 1125 days.

This patent is subject to a terminal disclaimer.

(21) Appl. No.: 12/561,935

(22) Filed: Sep. 17, 2009

(65) Prior Publication Data

US 2011/0063769 A1    Mar. 17, 2011

(51) Int. Cl.
    *H02H 3/08* (2006.01)
(52) U.S. Cl.
    USPC .................................................. 361/87
(58) Field of Classification Search
    CPC ......................................................... H02H 3/08
    USPC .......................................................... 361/87
    See application file for complete search history.

(56) References Cited

U.S. PATENT DOCUMENTS

| | | |
|---|---|---|
| 2,209,810 A | 7/1940 | Cordroy |
| 3,546,534 A | 12/1970 | Kotos |
| 3,558,984 A | 1/1971 | Smith |
| 4,322,768 A | 3/1982 | Maeda |
| 5,367,426 A | 11/1994 | Schweitzer, III |
| 5,418,776 A | 5/1995 | Purkey |
| 5,671,112 A | 9/1997 | Hu |
| 5,805,395 A | 9/1998 | Hu |
| 6,256,592 B1 | 7/2001 | Roberts |
| 6,341,055 B1 | 1/2002 | Guzman-Casillas |
| 6,356,421 B1 | 3/2002 | Guzman-Casillas |
| 6,442,010 B1* | 8/2002 | Kasztenny et al. ............. 361/63 |
| 6,456,947 B1 | 9/2002 | Adamiak |
| 6,518,767 B1 | 2/2003 | Roberts |
| 6,571,182 B2 | 5/2003 | Adamiak |
| 6,590,397 B2 | 7/2003 | Roberts |
| 6,879,917 B2 | 4/2005 | Turner |
| 7,345,863 B2 | 3/2008 | Fischer |

(Continued)

OTHER PUBLICATIONS

Roberts et al., "The Effect of Multiprinciple Line Protection on Dependability and Security," VII Seminário Técnico de Proteção e Controle, 2003.*

(Continued)

*Primary Examiner* — Stephen W Jackson
*Assistant Examiner* — Ann Hoang
(74) *Attorney, Agent, or Firm* — Stoel Rives LLP

(57) ABSTRACT

Current differential protection is provided for a multi-terminal power apparatus, such as a power transmission line. Currents measured at each of the multiple terminals are used to calculate a differential current and a restraining current, which are then converted into a first equivalent current and a second equivalent current of an equivalent two-terminal power apparatus. In the equivalent two-terminal power apparatus, a differential current derived from the first and second equivalent currents is substantially equal to the differential current of the original multi-terminal power apparatus. Similarly, a restraining current derived from the first and second equivalent currents is substantially equal to the restraining current of the original multi-terminal power apparatus. The first and second equivalent currents may be used in an alpha plane analysis to determine whether or not to trip the multi-terminal power apparatus.

29 Claims, 9 Drawing Sheets

(56) References Cited

U.S. PATENT DOCUMENTS

| | | | |
|---|---|---|---|
| 7,425,778 | B2 | 9/2008 | Labuschagne |
| 7,469,190 | B2 | 12/2008 | Bickel |
| 7,472,026 | B2 | 12/2008 | Premerlani |
| 7,812,615 | B2 | 10/2010 | Gajic |
| 8,289,668 | B2 * | 10/2012 | Kasztenny et al. ............. 361/87 |
| 2001/0012984 | A1 * | 8/2001 | Adamiak et al. ................ 702/58 |
| 2002/0101229 | A1 | 8/2002 | Roberts |
| 2007/0070565 | A1 * | 3/2007 | Benmouyal et al. ............ 361/62 |
| 2009/0059447 | A1 | 3/2009 | Gajic |
| 2009/0091867 | A1 | 4/2009 | Guzman-Casillas |
| 2010/0002348 | A1 | 1/2010 | Donolo |

OTHER PUBLICATIONS

Jeff Roberts, Demetrios Tziouvaras, Gabriel Benmouyal, Hector Altuve, The Effect of Multiprinciple Line Protection on Dependability and Security, Jun. 22-27, 2003.

PCT/US2010/049160 Patent Cooperation Treaty, International Search Report and Written Opinion of the International Searching Authority, Nov. 15, 2010.

Debra Carroll and John Dorfner, Tacoma Power, Tony Lee and Ken Fodero, Schweitzer Engineering Laboratories, Inc., Chris Huntley, GE Lentronics,Resolving Digital Line Current Differential Relay Security and Dependability Problems: A Case History 29th Annual Western Protective Relay Conference, Spokane Washington, Oct. 22-24, 2002.

Gabriel Benmouyal, Joe B. Mooney, Schweitzer Engineering Laboratories, Inc., Advanced Sequence Elements for Line Current Differential Protection, 2006.

Demetrios A. Tziouvaras, Jeff Roberts, and Gabriel Benmouyal, Schweitzer Engineering Laboratories, Inc., New Multi-Ended Fault Location Design for Two- or Three-Terminal Lines, Nov. 1, 2004.

Gabriel Benmouyal, Schweitzer Engineering Laboratories, Inc., The Trajectories of Line Current Differential Faults in the Alpha Plane, Sep. 22, 2005.

GE Industrial Systems L90 Line Current Differential System, UR Series Instruction Manual, Section 8, Manual P/N:1601-0081-T1(GEK-113488) L90 revision: 5.6x 2008, Section 8.

PCT/US2010/049162 Patent Cooperation Treaty International Search Report and Written Opinion of the International Searching Authority, Dec. 30, 2010.

Bogdan Kasztenny, Ilia Voloh, Eric A. Udren, Rebirth of Phase Comparison Line Protection Principle, 60th Annual Georgia Tech Protective Relaying Conference, Atlanta, Georgia, May 3-5, 2006.

Min Zhang, Xinzhou Dong, Z Q Bo, B R J Caunce, A Klimek, Simulation Tests of a Novel Criterion for Neutral Current Differential Protection, International Conference on Power System Technology, 2006.

PCT/US2010/049166 Patent Cooperation Treaty, International Search Report and Written Opinion of the International Searching Authority, Dec. 13, 2010.

* cited by examiner

Packet Payload Definition — 1000

| | |
|---|---|
| $i_{A(k)}$ | Present (k-th) sample of the line current, phase A. |
| $i_{A(k-1)}$ | k-1 sample of the line current, phase A. |
| $i_{A(k-2)}$ | k-2 sample of the line current, phase A. |
| $i_{B(k)}$ | As above, phase B. |
| $i_{B(k-1)}$ | |
| $i_{B(k-2)}$ | |
| $i_{C(k)}$ | As above, phase C. |
| $i_{C(k-1)}$ | |
| $i_{C(k-2)}$ | |
| $i_{AR}$ | Restraint term, phase A. |
| $i_{BR}$ | Restraint term, phase B. |
| $i_{CR}$ | Restraint term, phase C. |
| $i_{QR}$ | Negative-sequence restraint term. |
| $i_{GR}$ | Zero-sequence ($3I_0$) restraint term. |

EQUIVALENT ALPHA PLANE FAULT DETERMINATION FOR A MULTI-TERMINAL POWER APPARATUS

TECHNICAL FIELD

This disclosure relates to differential protection systems for a power apparatus, including but not limited to power lines and transformers. More particularly, this disclosure includes systems and methods for converting a multi-terminal power apparatus to an equivalent two-terminal power apparatus for alpha plane analysis.

BRIEF DESCRIPTION OF THE DRAWINGS

Non-limiting and non-exhaustive embodiments of the disclosure are described, including various embodiments of the disclosure with reference to the figures, in which:

FIG. 10 graphically illustrates a packet payload definition or data structure according to one embodiment.

DETAILED DESCRIPTION OF PREFERRED EMBODIMENTS

Introduction

Figure 1:
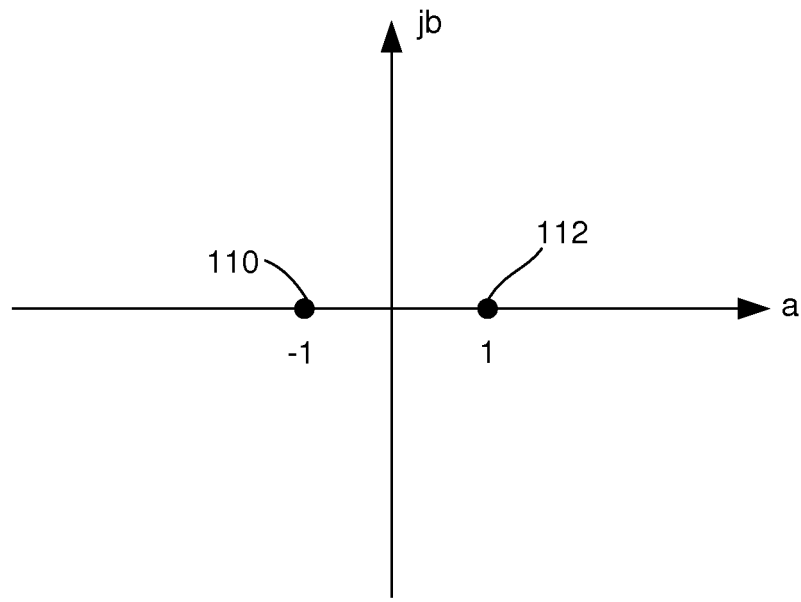
FIG. 1 is a simplified diagram of an alpha (current ratio) plane.

Modern power systems generally use high-speed fault clearing to preserve the transient (short-term) stability of the system and to provide better power quality by shortening duration of reduced voltage (voltage sag). Widely used fault protection systems satisfying such requirements for transmission lines, e.g., those power lines with nominal voltages of 115 KV and greater, are directional protection systems using directional comparison techniques. While the directional comparison approach has some advantages, including low channel (communication) requirements between relays positioned at local and remote ends of the power line, along with inherent redundancy, it does require voltage values obtained from the power signal on the power line. Such systems experience problems (often severe problems) because of voltage errors or missing voltages caused by various factors, including blown fuses in the secondary system, problems with windings in the system voltage transformer (VT) devices and transient responses in the system capacitive coupled voltage transformers.

One alternative to directional comparison systems using voltage values is a current differential system, which uses only the electrical current value information from the power line. Current differential systems, also known as line differential systems, do not require voltage measuring devices, as they do not use voltage values in their fault determinations. Line differential systems are less sensitive to power swings and sudden load changes in the system and are generally less sensitive to or even immune from certain conditions on the line, including zero sequence mutual coupling effects and/or current reversals, among others. However, along with the advantages are several significant disadvantages, including reliance on high communication channel performance, which is required between local and remote protective relays on the line. In addition, conventional line differential systems using phase current quantities are limited in their ground fault resistance coverage and are a compromise to an extent in security under current transformer (CT) saturation conditions.

An alpha plane protection system is disclosed in U.S. Pat. No. 6,518,767, titled "Line Differential Protection System for a Power Transmission Line," which is assigned to the assignee of the present disclosure, and which is hereby incorporated herein for all purposes. The alpha plane current differential protection principle (or alpha plane principle) disclosed in U.S. Pat. No. 6,518,767 provides a line differential protection system that, while still dependent upon a communication channel, includes significant improvements relative to other system considerations, including high fault resistance coverage and improved operating characteristics and sensitivity, while at the same time maintaining power system security.

For illustrative purposes, the example embodiments disclosed herein provide protection for power transmission lines. An artisan will recognize from the disclosure herein, however, that the disclosed principles may be applied to any protected plant or power apparatus to provide differential protection. As used herein, a "power apparatus" is a broad term that includes its normal and customary meaning and may include, for example, a power transmission line, a power bus, a large motor, a generator, a transformer, a combination of the foregoing, or any other device or devices that may be removed from a power system (e.g., using breakers and/or relays) when a fault is detected. A power system, for example, may be divided into zones of protection to allow for the removal of a minimal amount of equipment from the power system during a fault condition. Each zone may be associated with its own protection system such that a fault within a particular zone causes the corresponding protection system to operate, whereas a fault in another zone will not cause the protection system to operate. The zone boundaries may be defined by the location of measuring points (e.g., current transformers) and circuit breakers that operate to isolate the zone.

From a relay design perspective, working with a communication channel of a limited bandwidth is a general constraint of a microprocessor-based line current differential system. Historically, and practically today, line current differential relays work with 64 kbps channels. Even though direct point-to-point fiber connections allow bandwidths in the range of tens of megabits per second, and multiplexed channels can be requested with a bandwidth of N×64 kbps, the 64 kbps bandwidth continues to be a common application scenario.

To realize the amount of data that can be conveyed for protection purposes over a 64 kbps channel consider that 64,000 bits per second=1,067 bits per a 60 Hz power cycle=267 bits per quarter of a 60 Hz power cycle=66 bits per each of 16 sample sets in a 60 Hz power cycle. The 66 bits available 16 times a cycle may seem sufficient. However, as with any digital communication scheme, there may be certain overhead in the communication packet on top of the actual payload. In a line current differential system, the digitally encoded values of currents are included as part of the payload. Components of the overhead include: a header used to tell consecutive packets apart at the receiving end (using, e.g., a total of 15 bits); integrity of data may be protected by redundancy checks (BCH or CRC) (using, e.g., a total of 32 bits); channel based synchronization methods may append certain time values to the packet (using, e.g., a total of 16 bits or more); the packet may support basic addressing to prevent accidental cross-connection of line differential relays (using, e.g., a total of 4 to 8 bits for basic addressing); and direct transfer tripping (DTT) and other flags may be supported (using, e.g., a total of 4 to 8 bits). The above may add 50 to 80 bits of overhead.

Note that when sending packets 16 times, a 60 Hz power cycle over a 64 kbps channel one can only use 66 bits, having practically no room for payload even when significantly optimizing the payload and the overhead. Still, when designing relays for high speed of operation, it is beneficial to keep the rate at which fresh data is passed from subsystem to subsystem high so that the total data latency is minimized. Therefore, it is advantageous to exchange the analog data between line current differential terminals multiple times a cycle.

Accordingly, the task of passing the right data at a high rate is not trivial. The protection-driven payload and the communication-driven constraints may be addressed in a concurrent design in order to yield a high performance scheme. Thus, which quantities are sent, how often, and how they are encoded, packetized, and protected may affect the integrity of the protection system.

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or detailed description is for illustrative purposes only and is not meant to imply a required order, unless specified to require an order.

Embodiments may include various steps, which may be embodied in machine-executable instructions to be executed by a general-purpose or special-purpose processor or computer (or other electronic device). Alternatively, the steps may be performed by hardware components that include specific logic for performing the steps or by a combination of hardware, software, and/or firmware.

Embodiments may also be provided as a computer program product including a machine-readable medium having stored thereon instructions that may be used to program a computer (or other electronic device) to perform the processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/computer-readable medium suitable for storing electronic instructions.

Overview of Alpha Plane for Two Terminals

For a zone of protection, the alpha plane principle individually compares magnitudes and angles of currents within the zone. The alpha plane principle is naturally applied to two terminal lines in a zone of protection where the ratio of magnitudes is compared, as well as the relative angle between the two currents. In the determination of faults, a complex current ratio k is calculated and located in the alpha plane, which is a graphical representation of the vector ratio of the first current $I_1$ (e.g., remote current) to the second current $I_2$ (e.g., local current). Line current values from the first relay (e.g., remote relay) and the second relay (e.g., local relay) are combined into a ratio of current values. This ratio k has a magnitude and an angle and may be plotted on the complex current ratio plane with real and imaginary axes. It is understood that the directionality of both the currents is consistent with respect to the protected line—they are both measured into or out of the line.

FIG. 1 is a simplified diagram of an alpha (current ratio) plane. The labels for the two axes of the plane, a and jb, are derived as follows:

$$k = \frac{\overline{I_1}}{\overline{I_2}} = re^{j\theta} = a + jb \tag{1}$$

$$a = \mathrm{Re}\left(\frac{\overline{I_1}}{\overline{I_2}}\right), \tag{2}$$

$$b = \mathrm{Im}\left(\frac{\overline{I_1}}{\overline{I_2}}\right), \tag{3}$$

where Re and Im refer to the real and imaginary parts of the current ratio.

Ideally, through current appears in equal but opposite values at the two relays, so for load and external faults, $$k = \frac{I_1}{I_2} = 1\angle 180°, \tag{4}$$

which is represented by the point labeled 110 in FIG. 1.

With respect to internal faults, the fault current is equal at both ends of the line only when the line is homogenous and the contributions to the fault from both ends of the line are equal, e.g., when the two sources have equal strength and the fault is at the mid-point of the line. In such a case, $$k = \frac{I_1}{I_2} = 1\angle 0°. \tag{5}$$

However, as the internal fault moves toward the second (local) relay, $I_2$ will increase and point 112 in the alpha plane will move toward the origin when viewed from the second (local) relay. For large remote currents, when compared to the local current, the point will move away from the origin, as viewed from the second (local) relay. As the fault moves away from the second (local) relay, $I_2$ will decrease and the point will move.

It should be understood that a separate alpha plane representation would exist for each of the three phase currents $I_A$, $I_B$, and $I_C$. Further, in certain embodiments, a separate alpha plane representation may be provided for zero sequence currents, negative sequence currents, positive sequence currents, or combinations of the foregoing. For example, an alpha plane representation may include a current that is a combination of a zero sequence current (e.g., 25%) and a negative sequence current (e.g., 75%).

Various system factors, including non-homogenous power systems, cause the angle of the fault current in the alpha plane at each terminal to be different, which results in the ratio point for an internal fault to move up or down in the alpha plane along an arc that moves through the "a" axis. Various other factors, including line measurement errors, line charging current, CT (current transformer) saturation effects, transient effects in the power system compensation capacitors, and other aspects of the relay system can cause the current ratio k for external faults to move away from point 110 shown in FIG. 1. For internal faults, such factors will result in the current ratio moving around on the alpha plane.

The movement from point 110 in the alpha plane for external faults (e.g., from the ideal external fault or load) complicates the line differential system's decision in (1) declaring a fault on the protected line and tripping the associated circuit breaker on the line or (2) restraining the fault declaring action because the current ratio is due to load or an external fault or to system factors and/or errors.

There is a region defined in the alpha plane that is a "restrain" (block) region and a region that is an "operate" (trip) region, to enable appropriate decision making with respect to the restrain and operate options. In the present disclosure, all of the points in the alpha plane that should not result in a trip action by the line differential element define a restrain region for which there is no trip signal, while the remaining portions in the alpha plane are in the operate region for which a trip signal is normally allowed.

Figure 2:
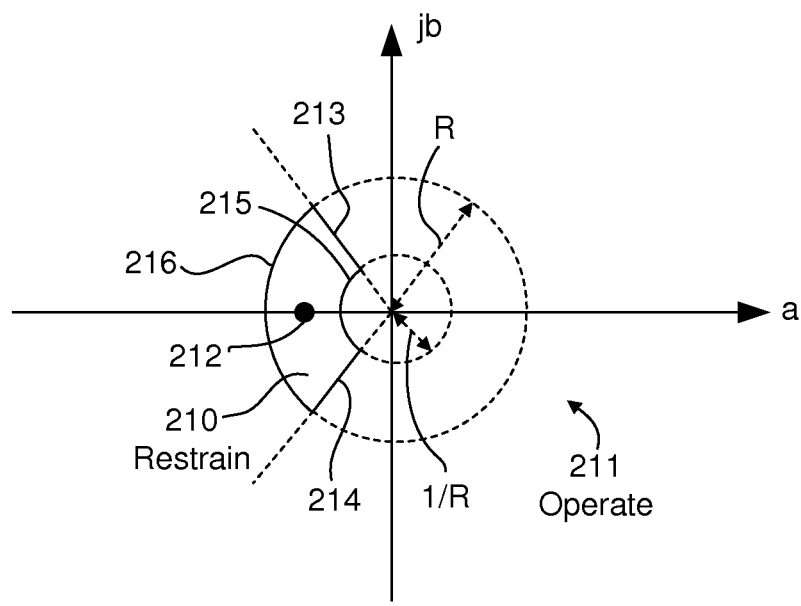
FIG. 2 graphically illustrates a restrain region and an operate region in an alpha plane used according to one embodiment for fault determination decisions.

FIG. 2 graphically illustrates a restrain region 210 and an operate region 211 in an alpha plane used according to one embodiment for fault determination decisions. For illustrative purposes, the restrain region 210 is shown as enclosed within solid lines. Again, the operate region 211 may include all points it the alpha plane that are not in the restrain region 210. The restrain region 210 in the alpha plane illustrated in FIG. 2 is placed around the ideal external fault point 212. The restrain region 210 is defined by a user-selected current ratio (blocking) angle (shown as the radial lines 213 and 214 above and below the "a" axis), the range of which accommodates current ratio values affected by various system factors, including line charging current values, CT saturation, and sample time and data alignment errors. The restrain region 210 is further defined by a user-selected magnitude of the current ratio (shown as the curved lines 215, 216), the range of which accommodates CT saturation among other factors. Generally, a user selects a radius R for the outer curved line 216, which results in the inner curve being set as 1/R. The alpha plane principle allows for shaping the restrain region 210 with more user control as compared with the traditional percentage-restrained differential principle.

Logic circuitry (not shown) may use a series of logical comparisons and other functions to determine where the current ratio k is located in the alpha plane, and specifically whether the current ratio k is within the restrain region 210, in which case there is no trip signal. When the current ratio k is outside of the restrain region 210, into the operate region 211, a trip signal is produced if the measured current values have satisfied certain threshold and other characteristics.

Multi-Terminal Alpha Plane Analysis

Being intuitive and straightforward in two-terminal applications, the alpha plane is less natural in a general N-terminal case. Complex current flow patterns can be encountered, such as a circulating current—a current leaving the zone at one terminal to re-enter it at the other. These patterns should be analyzed carefully in order to avoid a failure to trip by responding to one of the current flowing out of the zone to feed a load or circulating to the other line terminal. Many possible permutations of ratios between many possible currents would complicate understanding, implementation, testing and post event analysis of relays applying alpha plane to multiple terminals.

Thus, certain embodiments disclosed herein include a generalized N-terminal alpha plane concept. This protection method calculates a two-terminal equivalent for a general N-terminal case, and applies the alpha plane principle to two equivalent currents instead of to the multitude of the measured currents.

Figure 3:
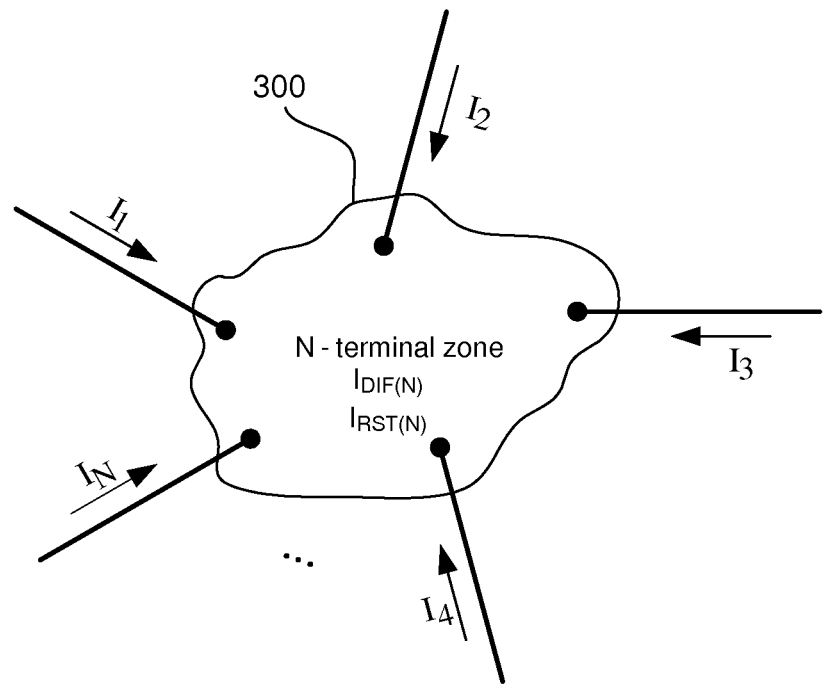
FIG. 3 schematically illustrates a general N-terminal differential zone of protection according to one embodiment.

FIG. 3 schematically illustrates a general N-terminal differential zone 300 of protection according to one embodiment. In this example, the N-terminal zone 300 includes currents $I_1$, $I_2$, $I_3$, $I_4$, . . . , $I_N$ that each corresponds to a respective terminal. An artisan will recognize from the disclosure herein that any number of currents greater than one may be used for the N-terminal zone 300. For example, if N=3 for a three terminal system, then only currents $I_1$, $I_2$, and $I_3$ would correspond to the N-terminal zone 300. The differential principle would derive the following differential current $I_{DIF(N)}$ and restraining current $I_{RST(N)}$ for the N-terminal zone 300:

$$I_{DIF(N)} = \sum_{k=1}^{N} I_k, \tag{6}$$

$$I_{RST(N)} = \sum_{k=1}^{N} |I_k|. \tag{7}$$

In this example embodiment, the restraining current $I_{RST(N)}$ is a summation of current amplitudes. An artisan will recognize, however, that the restraining current $I_{RST(N)}$ may be determined in a variety of different ways. The restraining current $I_{RST(N)}$ is used to provide a notion of the current flowing through the zone 300. Thus, depending on the particular application, the restraining current $I_{RST(N)}$ may be defined as the maximum measured current (e.g., where the highest current corresponds to an external fault current), a summation of current amplitudes (as used in equation (7) and the example solution provided herein), a summation of currents that is divided by the total number of currents (e.g., the average current), or a product of currents.

Figure 4:
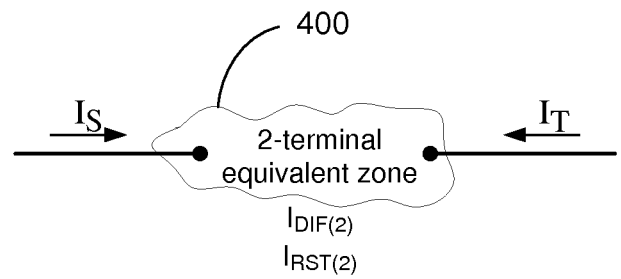
FIG. 4 schematically illustrates a two-terminal equivalent zone of protection according to one embodiment.

FIG. 4 schematically illustrates a two-terminal equivalent zone 400 of protection according to one embodiment. As discussed above, a two-terminal zone is the natural application for the alpha plane. The two-terminal equivalent zone 400 shown in FIG. 4 includes two virtual currents $I_S$, $I_T$ that provide an equivalent representation of the currents $I_1$, $I_2$, $I_3$, $I_4$, . . . , $I_N$ of the N-terminal zone 300 shown in FIG. 3. The differential principle may be applied to the two virtual currents $I_S$, $I_T$ to derive a differential current $I_{DIF(2)}$ and a restraining current $I_{RST(2)}$ for the two-terminal equivalent zone 400.

The two virtual currents $I_S$, $I_T$ in the two-terminal equivalent zone 400 are sought such that the same differential current and the same restraining currents are determined in the two-terminal equivalent zone 400 as in the actual N-terminal zone 300:

$$I_{DIF(2)} = I_{DIF(N)}, \quad (8)$$

$$I_{RST(2)} = I_{RST(N)}. \quad (9)$$

The two currents $I_S$, $I_T$ of the two-terminal equivalent have a total of four degrees of freedom (two magnitudes and two angles), while there are a total of three boundary equations: the real and imaginary parts of the differential current (equation (8)), and the magnitude of the restraining current (equation (9)). Thus, there are three equations and four unknowns.

To solve for the four unknowns according to certain embodiments, a fourth balance equation is provided (or the number of unknowns is reduced to three) by assigning an attribute from one of the N measured zone currents $I_1, I_2, I_3, I_4, \ldots, I_N$ to either one of the two equivalent currents $I_S$, $I_T$. For example, the zone current $I_1, I_2, I_3, I_4, \ldots, I_N$ with the greatest amplitude may be selected for the magnitude of one of the virtual currents $I_S$, $I_T$.

In another embodiment, the fourth balance equation calls for one of the two equivalent currents $I_S$, $I_T$ to be in phase with a specific zone current $I_P$ selected from among the N zone currents $I_1, I_2, I_3, I_4, \ldots, I_N$.

In one example embodiment, the specific zone current $I_P$ is selected as the zone current $I_1, I_2, I_3, I_4, \ldots, I_N$ that is the highest after projection on the line of the differential current $I_{DIF(N)}$. A rationale behind this choice is that during external faults with CT saturation the spurious differential signal, if significant, will be approximately located along the line of the fault current. Therefore, by selecting the reference current $I_P$ that is closest in phase to the differential current, the conversion positions the two equivalent alpha plane currents $I_S$, $I_T$ along the lines of the current flowing into and out of the zone 300.

To select the reference current $I_P$ according to one embodiment, the following auxiliary numbers $R_k$ are calculated first:

$$R_k = |\text{real}(I_k I_{DN}^*)|, \quad k=1 \ldots N, \quad (10)$$

wherein $I^*_{DN}$ represents the complex conjugate of the differential current $I_{DIF(N)}$ of the N-terminal zone 300.

The current with the highest value of R becomes the reference current $I_P$. Denoting the angle of this current as $\beta$:

$$\beta = \text{angle}(I_P). \quad (11)$$

The differential current $I_{DIF(N)}$ is shifted for the convenience of subsequent calculations as follows:

$$I_X = I_{DIF(N)} \cdot 1 \angle (-\beta). \quad (12)$$

The two currents $I_S$, $I_T$ of the two-terminal equivalent zone 400 are now calculated as follows:

$$I_T \left( \frac{\text{Im}(I_X)^2 - (I_{RST(N)} - \text{Re}(I_X))^2}{2 \cdot (I_{RST(N)} - \text{Re}(I_X))} + j \cdot \text{Im}(I_X) \right) \cdot 1 \angle \beta, \quad (13)$$

$$I_S = (I_{RST(N)} - |I_T|) \cdot 1 \angle \beta. \quad (14)$$

The two-terminal alpha plane protection principle takes over from here, working with the $I_S$ and $I_T$ currents. Thus, $I_S$ and $I_T$ may be used to calculate the complex current ratio k as:

$$\frac{I_S}{I_T} = k = k_{mag} \angle \alpha. \quad (15)$$

One application of the process discussed above is to convert a multi-terminal power apparatus that includes three or more terminals into an equivalent two-terminal power apparatus for use with the alpha plane. An artisan will recognize from the disclosure herein that the method may also be used for a two-terminal power apparatus. In other words, the same process may be used for a two-terminal power apparatus and a power apparatus that has three or more terminals. When the above equations are applied to a two-terminal power apparatus having a first measured current $I_1$ and a second measured current $I_2$, for example, the result is that the equivalent currents $I_S$, $I_T$ respectively equal the measured currents $I_1$, $I_2$.

The differential principle has been used in the method discussed above as a mathematical mapping tool to project the general case of the N-terminal differential zone 300 into the equivalent two-terminal zone 400, requiring the differential current $I_{DIF(N)}$ and the restraining current $I_{RST(N)}$ to be identical between the N-terminal application and its two-terminal equivalent. The method may be applied to phase, negative sequence, and/or ground differential elements with filtered differential and restraint currents from partial terms (discussed in detail below) communicated between the various relays of the N-terminal system.

Figure 5A:
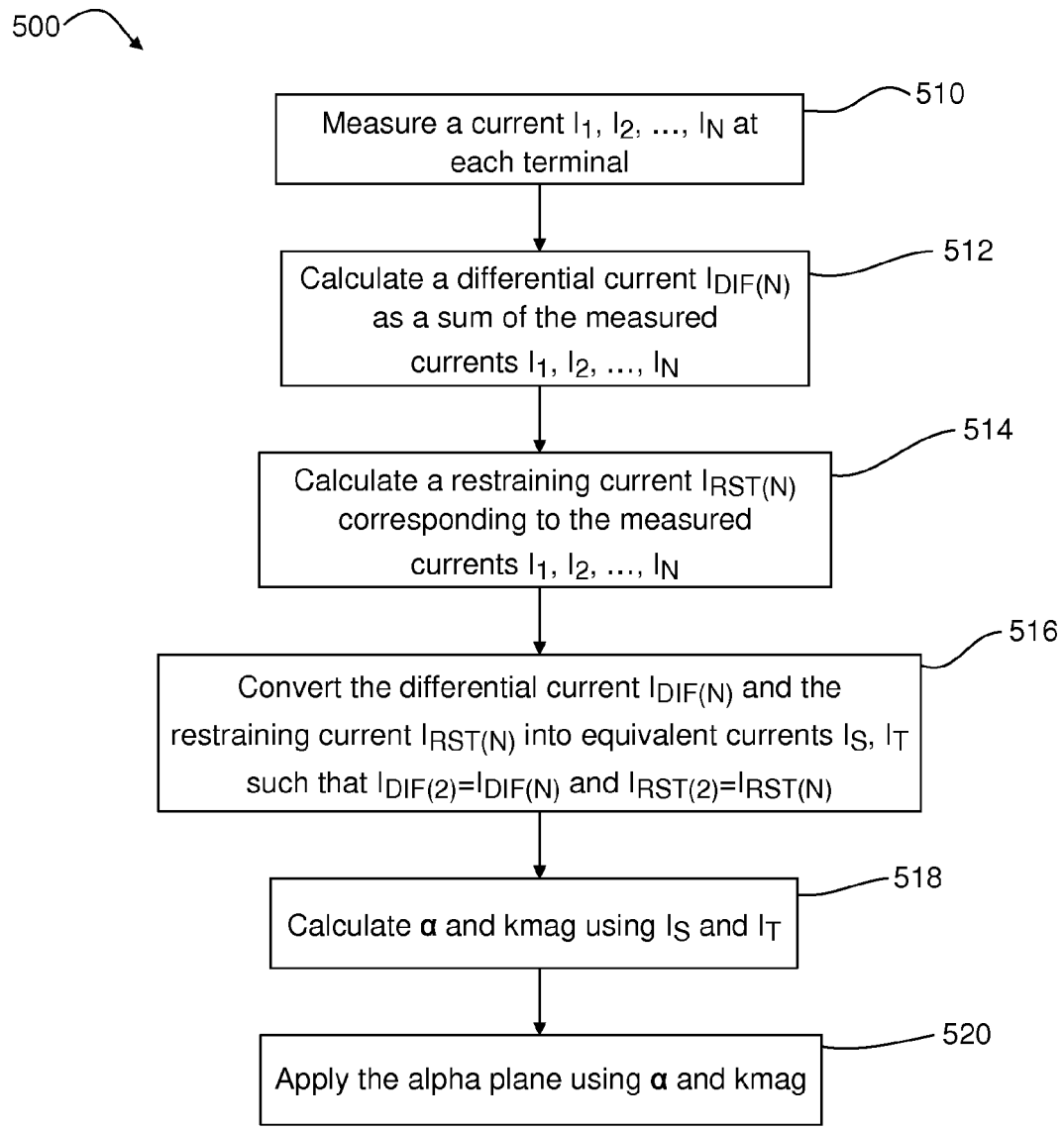
FIG. 5A is a flow diagram of a method for current differential protection of a multi-terminal power apparatus according to one embodiment.

FIG. 5A is a flow diagram of a method 500 for current differential protection of a multi-terminal power apparatus according to one embodiment. The method 500 includes measuring 510 a current $I_1, I_2, \ldots, I_N$ at each terminal, respectively. The method 500 also includes calculating 512 a differential current $I_{DIF(N)}$ as a sum of the measured currents $I_1, I_2, \ldots, I_N$, and calculating 514 a restraining current $I_{RST(N)}$ corresponding to the currents $I_1, I_2, \ldots, I_N$. As discussed above, in one embodiment, the restraining current $I_{RST(N)}$ is calculated as a sum of the absolute values (amplitudes) of the measured currents $I_1, I_2, \ldots, I_N$. Then, the method 500 includes converting 516 the differential current $I_{DIF(N)}$ and the restraining current $I_{RST(N)}$ into equivalent currents $I_S$, $I_T$ such that $I_{DIF(2)} = I_{DIF(N)}$ and $I_{RST(2)} = I_{DIF(N)}$. As discussed in detail below, in some embodiments the differential current $I_{DIF(N)}$ and/or the restraining current $I_{RST(N)}$ may be intentionally augmented before being converted 516 to the equivalent currents $I_S$, $I_T$. The augmentation may be based on a physical condition of the multi-terminal power apparatus. The method 500 further includes calculating 518 a and $k_{mag}$ using the equivalent currents $I_S$, $I_T$ (see equation (15) above), and applying 520 the alpha plane using a and $k_{mag}$.

Figure 5B:
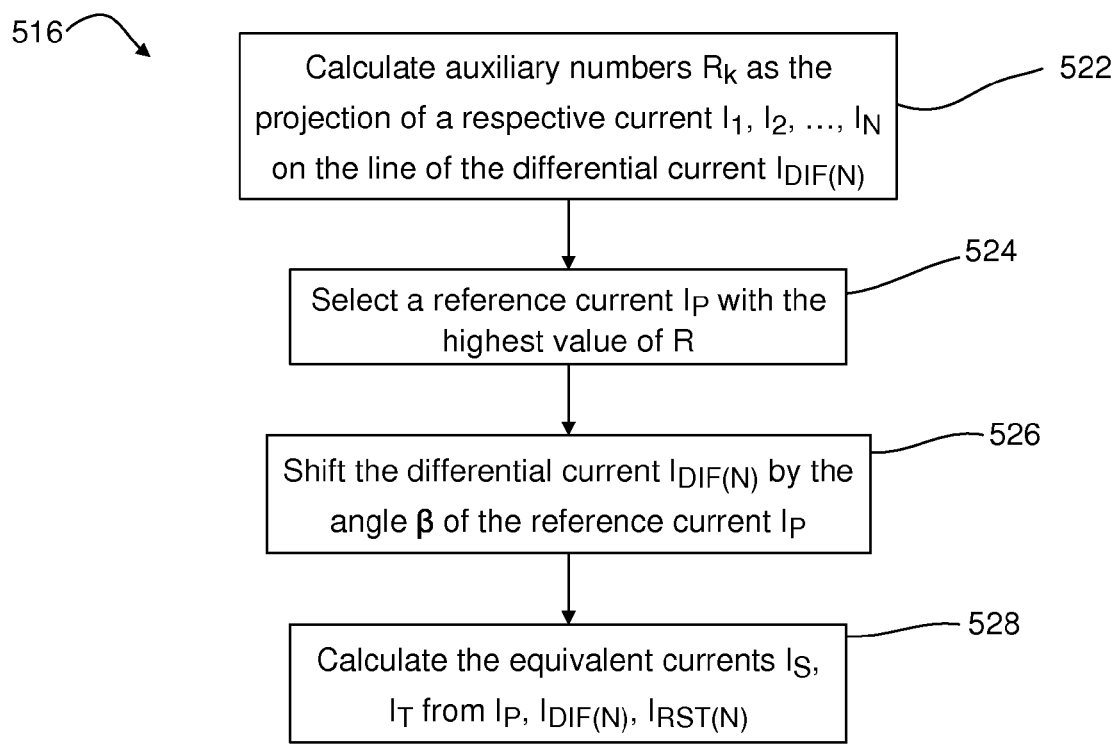
FIG. 5B is a flow diagram of a method for converting a differential current and a restraining current into the equivalent currents according to one embodiment.

FIG. 5B is a flow diagram of a method 516 for converting the differential current $I_{DIF(N)}$ and the restraining current $I_{RST(N)}$ into the equivalent currents $I_S$, $I_T$ according to one embodiment. The method 516 includes calculating 522 auxiliary numbers $R_k$ as the projection of a respective current $I_1, I_2, \ldots, I_N$ on the line of the differential current $I_{DIF(N)}$, selecting 524 a reference current $I_P$ as the current corresponding to the highest value of R, shifting 526 the differential current $I_{DIF(N)}$ by the angle $\beta$ of the reference current $I_P$, and calculating 528 the equivalent currents $I_S$, $I_T$ from $I_P$, $I_{DIF(N)}$, and $I_{RST(N)}$.

The generalized alpha plane allows implementation of the two-terminal principle to multi-terminal lines, retaining advantages while enabling new applications. Note the following:

(1) As discussed above, the generalized principle is transparent in two-terminal applications. In other words, the two equivalent currents equal the two actual currents.

(2) Any case with a balanced differential current and non-zero restraining current yields an ideal blocking point on the alpha plane ($1\angle 180°$). Decreasing the differential current, such as by line charging current compensation (discussed below), brings the alpha plane point closer to the ideal blocking position.

(3) Any case with higher restraining current under a given differential current brings the alpha plane point closer to the ideal blocking point. The method allows applications where the restraint term is artificially increased such as when using harmonic restraint in transformer protection (discussed below).

(4) As discussed below, the principle works well without the need to communicate all local currents individually from all terminals. The partial differential and restraint terms in the disclosed communication package map well into the generalized alpha plane.

(5) The principle works well during external fault under CT saturation. First, by relying on the true restraint term, the calculated alpha plane point shows a strong blocking tendency. Second, extra security is added by the nature of the alpha plane itself.

(6) The principle works very well for elements that implement ground (e.g., 87 LG) and negative-sequence (e.g., 87 LQ) differential functions. Under internal faults, the elements' currents are close in phase, and differ only by the system non-homogeneity angles. The generalized alpha plane returns a strong unblocking indication in this case regardless of the magnitudes of the compared currents. Under external faults, including faults that do not produce any natural restraint (phase to phase faults for the 87 LG, for example), a cross phase restraint may be used upon detecting an external fault by other elements of the logic circuit, such as an external fault detector (EFD). With increased restraint, the equivalent alpha plane point shifts safely toward blocking.

(7) By reducing a differential zone of protection with any number of terminals to a single operating point on the alpha plane, the principle simplifies implementation, testing, and post event analysis.

An artisan will recognize other advantages from the embodiments disclosed herein.

Examples of Multi-Terminal Alpha Plane

The following numerical embodiments of multi-terminal alpha plane analysis are provided by way of example only, and not by limitation. An artisan will recognize from the disclosure herein that any current values may be used and/or that any number of terminals may be used, including two terminals. Further, the numbers used in these examples may be approximations.

Figure 6A:
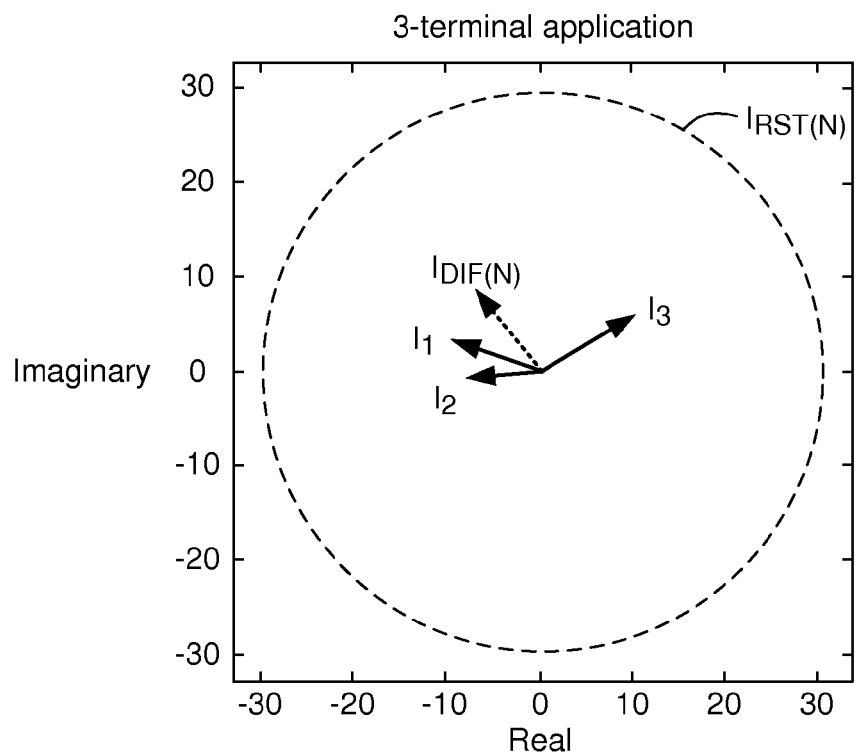
FIG. 6A graphically illustrates an alpha plane for a three-terminal application (N=3) according to one example embodiment.

FIG. 6A graphically illustrates an alpha plane for a three-terminal application (N=3) according to one example embodiment. In this example, the three currents $I_1$, $I_2$, $I_3$ measured at the three respective terminals are:

$I_1 = 10.0 \, A \angle 160°$, $I_2 = 8.0 \, A \angle -175°$, $I_3 = 12.0 \, A \angle 30°$.

The three measured currents $I_1$, $I_2$, $I_3$ are plotted on the alpha plane shown in FIG. 6A. Using equation (6), the differential current $I_{DIF(N)} = 11.2 \, A \angle 128°$. Using equation (7), the restraining current $I_{RST(N)} = 30.0$. The measured currents $I_1$, $I_2$, $I_3$ are shown as solid lines in FIG. 6A. While the differential current $I_{DIF(N)}$ and the restraining current $I_{RST(N)}$ are not generally shown on the alpha plane, for illustrative purposes, the differential current $I_{DIF(N)}$ is shown as a dashed line and the restraining current $I_{RST(N)}$ is shown as a dashed circle in FIG. 6A.

Following the methods discussed above and illustrated in FIGS. 5A and 5B, equation (10) provides the auxiliary numbers $R_k$ as:

$R_1 = 97.37 \, A^2$, $R_2 = 49.50 \, A^2$, $R_3 = 20.14 \, A^2$.

Because $R_1$ is the largest of the three auxiliary numbers, the corresponding first current $I_1$ is selected as the reference current $I_P = 10.0 \, A \angle 160°$. This means that one of the equivalent currents will be located on the line of 160° or −20°.

Solving equations (12), (13), and (14) for the two-current equivalent provides:

$I_T = 11.1 \, A \angle 11.7°$ and $I_S = 18.9 \, A \angle 160°$.

Figure 6B:
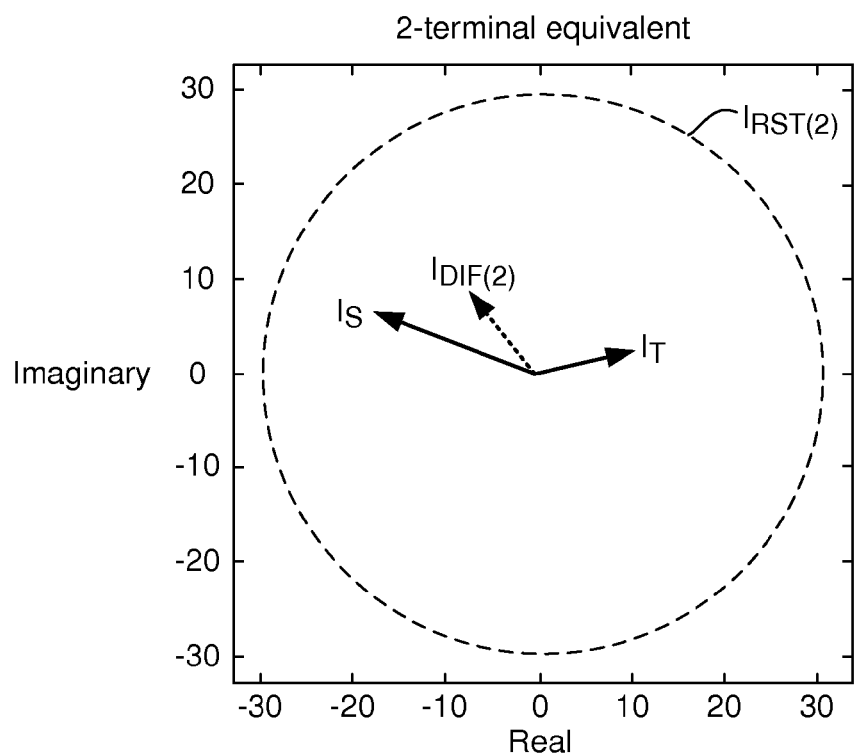
FIG. 6B graphically illustrates an alpha plane for the two-terminal equivalent of the embodiment shown in FIG. 6A according to one embodiment.

FIG. 6B graphically illustrates an alpha plane for the two-terminal equivalent of the embodiment shown in FIG. 6A according to one embodiment. Using equation (6), the equivalent differential current $I_{DIF(2)} = 11.2 \, A \angle 128°$. Using equation (7), the equivalent restraining current $I_{RST(2)} = 30.0$. The equivalent currents $I_S$, $I_T$ are shown as solid lines in FIG. 6B. For illustrative purposes, the equivalent differential current $I_{DIF(2)}$ is shown as a dashed line and the equivalent restraining current $I_{RST(2)}$ is shown as a dashed circle in FIG. 6B. Note that when calculated for this two-terminal equivalent, the equivalent differential current $I_{DIFF(2)}$ and the equivalent restraining current is $I_{RST(2)}$ are the same as those calculated in the original three-terminal system.

Using equation (15), the two equivalent currents $I_S$, $I_T$ give the operating point on the alpha plane of $k = 1.71 \angle 148.3°$, which is not shown in FIGS. 6A and 6B. Because this example does not include the limits of a restrain region, it is not determined whether this operating point k would result in assertion of a tripping signal. If the operating point k is outside the restrain region, however, the alpha plane in FIG. 6A indicates that this is likely the result of an external fault because the third current $I_3$ is near 180° from the sum of the first and second currents $I_1$, $I_2$. Similarly, FIG. 6B indicates that a fault condition would be an external fault because the phase difference between the equivalent currents $I_S$, $I_T$ is close to 180° and the ratio of magnitudes is not far from 1.

Figure 7A:
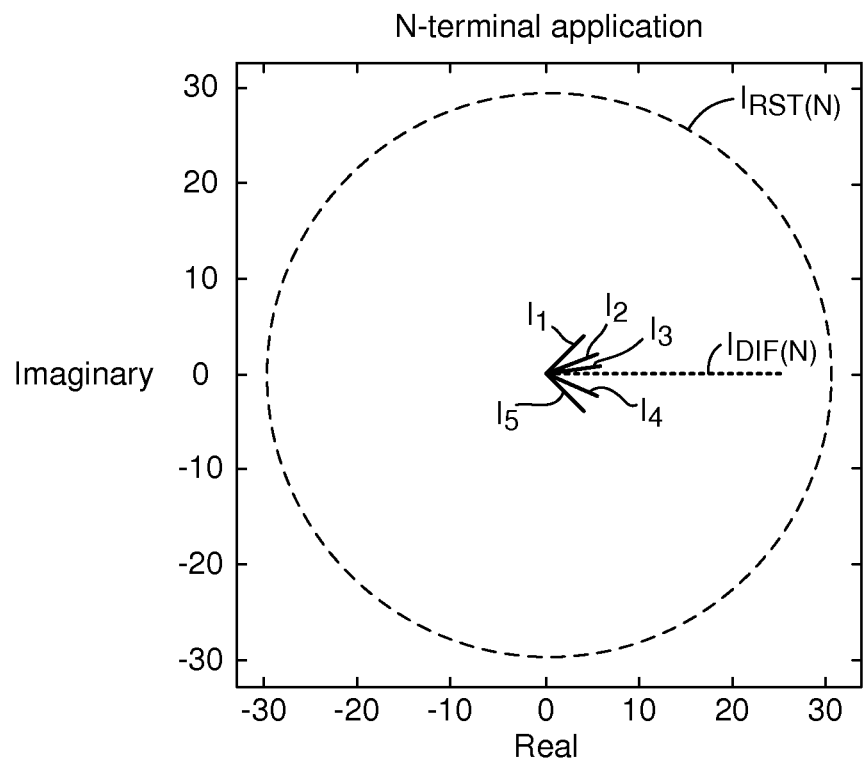
FIGS. 7A and 7B graphically illustrate respective alpha planes for the case of an internal fault according to one embodiment.
Figure 7B:
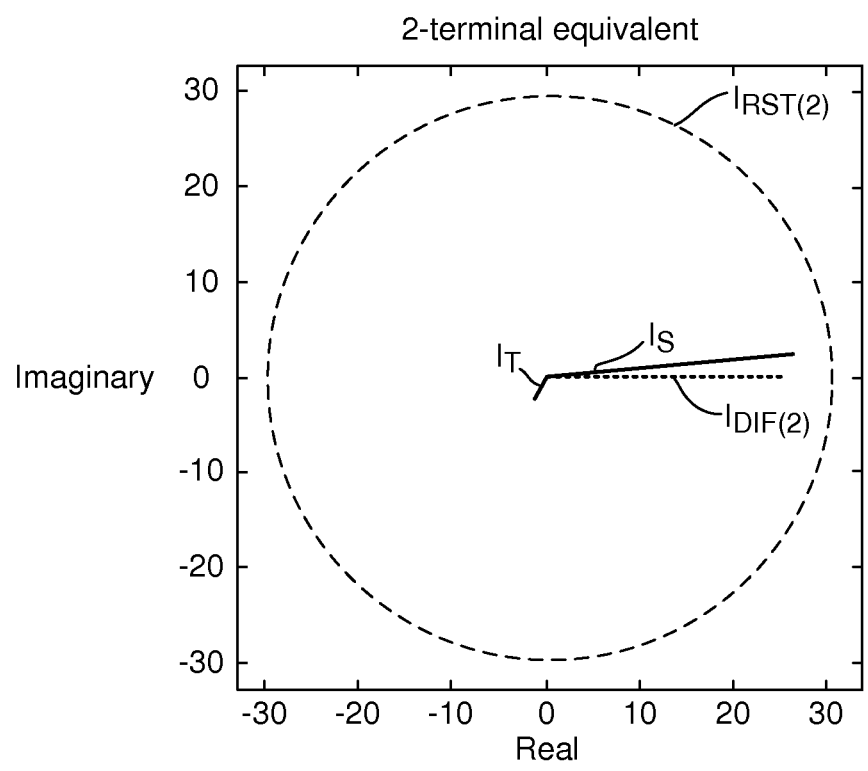

By way of contrast with the example shown in FIGS. 6A and 6B, FIGS. 7A and 7B graphically illustrate respective alpha planes for the case of an internal fault according to one embodiment. FIG. 7A illustrates the alpha plane for a five-terminal power apparatus where the five measured currents $I_1$, $I_2$, $I_3$, $I_4$, $I_5$ are approximately equal in magnitude but flow in the same general direction with some limited angle dispersion, which indicates an internal fault. FIG. 7B illustrates the alpha plane for the two-terminal equivalent of the embodiment shown in FIG. 7A. A large difference between the magnitudes of the equivalent currents $I_S$, $I_T$ (as shown in FIG. 7B) indicates the internal fault, which results in asserting a trip signal.

The examples shown in FIGS. 6A, 6B, 7A, and 7B are static in that they represent currents measured at a particular point in time. The next example is dynamic in that it illustrates changes in current over time. In this example, dual-breaker terminals are used. Modern line protection relays may support two three-phase sets of current inputs and measure the two currents independently facilitating applications to lines terminated via two circuit breakers. Such an integrated protection package works with the internally summed current for the main protection function—distance, ground directional overcurrent in a pilot-assisted scheme, or the line current differential. At the same time it provides for two independent breaker failure functions, two independent auto-reclosers, metering, recording and time coordinated backup all responding to the individual breaker currents.

Figure 8:
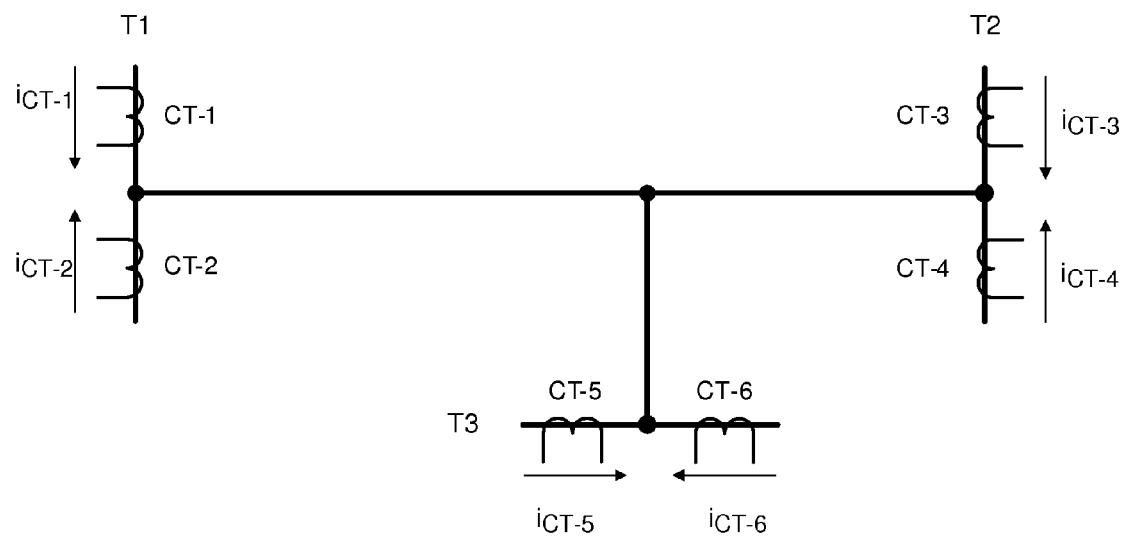
FIG. 8 schematically illustrates a three-terminal dual-breaker line configuration according to one embodiment.
Figure 9:
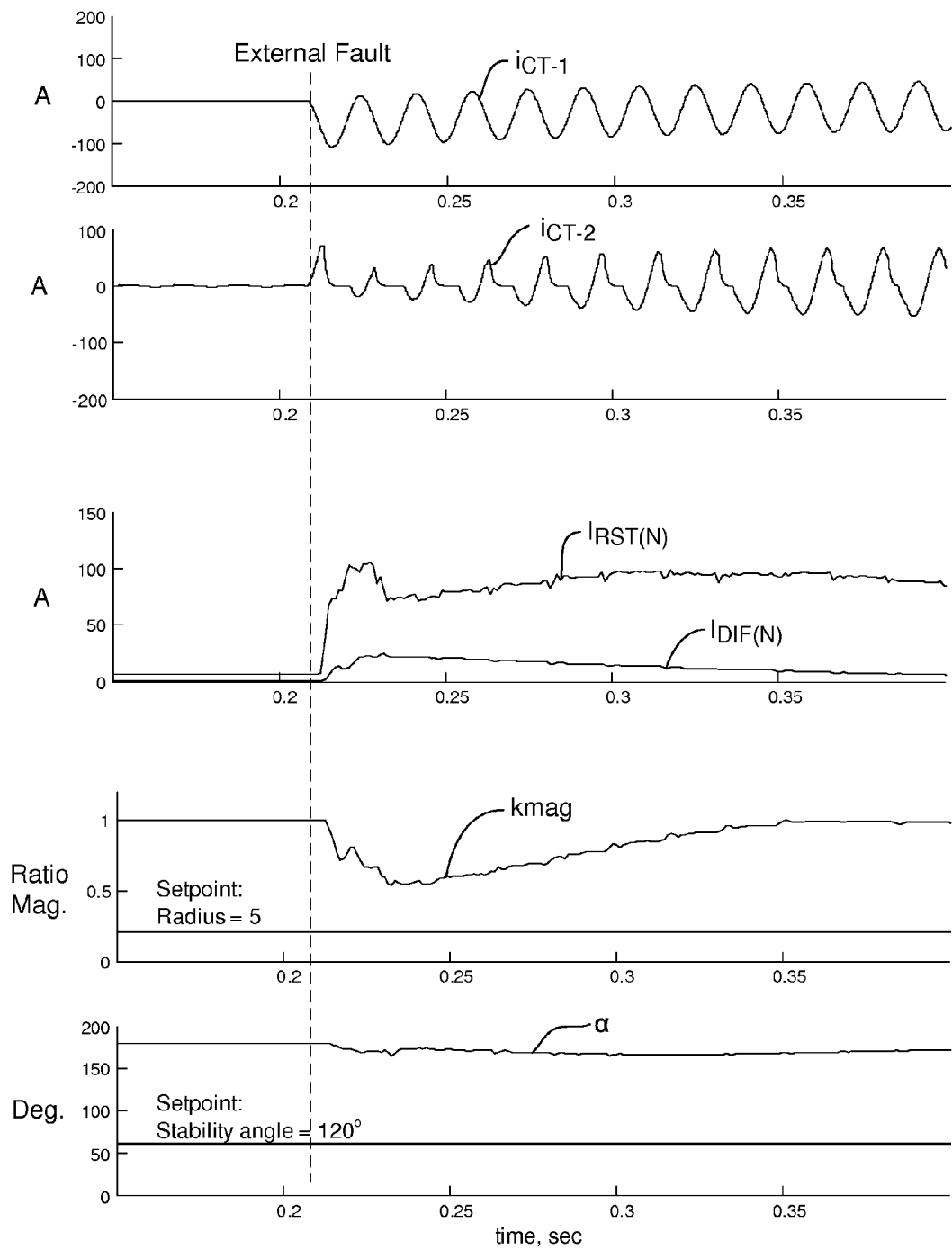
FIG. 9 illustrates plots of various signals during an external AB fault in the configuration shown in FIG. 8 according to one embodiment.

FIG. 8 schematically illustrates a three-terminal dual-breaker line configuration according to one embodiment. A first terminal T1 includes two breakers with associated current transformers CT-1, CT-2 measuring currents $i_{CT-1}$, $i_{CT-2}$. A second terminal includes two breakers with associated current transformers CT-3, CT-4 measuring currents $i_{CT-3}$, $i_{CT-4}$. A third terminal includes two breakers with associated current transformers CT-5, CT-6 measuring currents $i_{CT-5}$, $i_{CT-6}$. FIG. 9 illustrates plots of various signals during an external AB fault in the configuration shown in FIG. 8 according to one embodiment. Each signal is plotted with respect to time. The top plot shows the internal current $i_{CT-1}$ of the first terminal T1. The next plot shows the internal current $I_{CT-2}$ of the first terminal T1. The next plot shows the differential current $I_{DIF(N)}$ and the restraint current $I_{RST(N)}$. The bottom two plots show the magnitude $k_{mag}$ and the angle a, respectively, of the equivalent alpha plane. As shown, shortly after the beginning of the external fault the equivalent alpha plane yields an operating point of about 0.5∠170°, which is (correctly) within a typical blocking region of the alpha plane. Note that in this case the reference current $I_P$ is selected with some approximation as the line current differential system may not work directly with the individual currents at the faulted terminal but with partial differential and restrain terms explained below and related to the sums $i_{CT-1}+i_{CT-2}$, $i_{CT-3}+i_{CT-4}$, and $i_{CT-5}+i_{CT-6}$. Still, the large restraint term compared with the spurious differential keeps the equivalent alpha plane in the blocking region.

Intentionally Augmenting the Differential and/or Restraining Currents

As mentioned above, in certain embodiments at least one of the differential current $I_{DIF(N)}$ and the restraining current $I_{RST(N)}$ is intentionally augmented based on a physical condition of the multi-terminal power apparatus before calculating the equivalent currents $I_S$, $I_T$.

Upon detecting an external fault, for example, the system may increase security by artificially increasing the natural restraint terms. This may include harmonic restraint—adding harmonics in the differential current $I_{DIF(N)}$ to the restraining current $I_{RST(N)}$, or adding a portion of the phase restraints to the negative- and zero-sequence restraint terms to secure these elements under external faults that do not produce any natural sequence restraint. Increasing the restraint terms brings the operating point k in the alpha plane closer to the ideal blocking point.

For transformer protection according to one embodiment, the harmonics of interest (e.g., second, fourth and fifth harmonics) in the differential current $I_{DIF(N)}$ and/or any of the measured currents are added to the fundamental frequency restraint terms using appropriate multipliers as per the principles of treating a magnetizing inrush condition using harmonic restraint. Subsequently, the generalized alpha plane calculations are executed. If the restraint terms are increased sufficiently by the harmonics in the differential signal, the boosted restraint will shift the alpha plane toward the blocking point and restrain the differential function during inrush conditions.

In addition, or in another embodiment, the intentional augmentation may include decreasing the differential current $I_{DIF(N)}$, such as by line charging current compensation. The purpose of line charging compensation is to substantially remove the charging current from the differential signal. A line current differential system may calculate the charging current based on the voltage from line terminals. In one embodiment, this is done without sending any voltages between the terminals. Instead, each terminal subtracts an appropriately selected fraction of the charging current from the measured current before sending such a total current to its peers. When added up in the differential calculations all the fractions of the calculated charging current will, however, match the actual total charging current of the line. In general, for a line with N terminals performing charging current compensation, each terminal uses 1/N of the total line capacitance and its own voltage to estimate its share of the charging current.

Using Partial Differential and Restraint Terms

In general, the following solutions may aid the task of sending sufficient information for line current differential protection while observing practical bandwidth limitations of the available channels:

(1) Smart encoding—properties of the sent data, if studied carefully, may allow reducing the number of bits required to convey their values. For example, a negative-sequence restraint may be sent as per unit of the highest phase current restraint. Or, the value of current may be encoded on a log-based scale rather than a linear scale to recognize the wide range of current signals.

(2) Interleaving, or sending small fragments of slowly changing data in consecutive packets. For example, the channel based synchronization calculations may be run at a rate lower than the packet rate.

(3) Sending various pieces of data at optimum rates used by the applied protection equations.

(4) Increasing the packet size so that the payload-to-overhead ratio becomes more favorable.

(5) Selecting the payload in a way that maximizes the information content in it given the intended protection equations.

FIG. 10 graphically illustrates a packet payload definition 1000 or data structure according to one embodiment. When used with certain protection methods disclosed herein, the packet payload definition 1000 shown in FIG. 10 works with 1 kHz samples of currents and utilizes proven alpha-plane protection equations. The packet payload definition may be encoded using slightly more than 100 bits, which allows the system to send packets approximately every 3 ms (3 ms at 64 kbps is worth about 192 bits). It should be noticed that the sampling rate, number of samples in the packet and the transmission interval are examples only and do not limit the overall approach described above. For example, the number of line current samples for each phase (e.g., $i_{A(k)}$, $i_{A(k-1)}$, $i_{A(k-2)}$ for phase A) is not limited to three samples.

In short, the line current samples or instantaneous values included the packet payload definition 1000 are total line currents at the sending terminal (a sum of all the local currents such as from two breakers of a dual-breaker termination); while the restraint terms are sums of magnitudes of all the local currents (such as from the two breakers of a dual-breaker termination). Simply put the instantaneous values are partial line differential currents, and the restraint terms are partial line restraint currents.

The packet payload definition 1000 is advantageous for certain embodiments because it provides that fresh data is sent multiple times a cycle (e.g., every 3 ms, or more than five times a 60 Hz cycle), minimizing latencies and speeding up operation of the relay. A packet lost just before or during an internal fault erases only 3 ms of data allowing for fast recovery and preventing delayed operation of the relay. Further, working with 1 kHz samples offers good fidelity of differential current measurements and allows calculating harmonics for in-line transformer applications and fast detection of saturated CTs. Sending three samples of instantaneous current per packet improves the payload-to-overhead ratio. Sending one value of a restraint per packet (or per three samples of instantaneous values) reduces bandwidth requirements, while it is sufficient for protection application. Restraints are magnitudes, thus unsigned values, and can be encoded using fewer bits. In addition, the restraints are auxiliary terms and can be encoded with lower accuracy without sacrificing protection performance. The five restraint terms can be interleaved to save extra communication bandwidth. The negative- and zero-sequence restraint terms can be encoded as per unit values with respect to the highest phase restraint, further reducing the bandwidth requirement. Also, the packet format makes the solution scalable as it works with any number of local currents at a given line terminal. For any given configuration or number of terminals, the packet includes the partial differential and partial restraint terms.

As an example, refer again to the three-terminal line configuration illustrated in FIG. 8, wherein each line end or terminal T1, T2, T3 is terminated as a dual-breaker connection. In one embodiment, each terminal T1, T2, T3 calculates its partial differential and partial restraint terms as follows (note that here $I_X$ is the amplitude of $i_X$, e.g., $I_{CT-1(A)}=|i_{CT-1(A)}|$, where "(A)" refers to the A phase):

$$i_{A(T1)} = i_{CT-1(A)} + i_{CT-2(A)}; \tag{17}$$

$$i_{B(T1)} = i_{CT-1(B)} + i_{CT-2(B)}; \tag{18}$$

$$i_{C(T1)} = i_{CT-1(C)} + i_{CT-2(C)}; \tag{19}$$

$$I_{AR(T1)} = I_{CT-1(A)} + I_{CT-2(A)}; \tag{20}$$

$$I_{BR(T1)} = I_{CT-1(B)} + I_{CT-2(B)}; \tag{21}$$

$$I_{CR(T1)} = I_{CT-1(C)} + I_{CT-2(C)}; \tag{22}$$

$$I_{QR(T1)} = I_{1Q} + I_{2Q}; \tag{23}$$

$$I_{GR(T1)} = I_{1G} + I_{2G}; \tag{24}$$

Similar partial differential and partial restraint terms are determined for the other terminals T2, T3.

The above quantities in equations (17) to (24) comprise a protection payload as per the packet payload definition 1000 shown in FIG. 10. Each terminal calculates its own partial terms and sends them to its peers.

By way of example, assume that an external fault occurs at the T1 terminal. Under CT saturation, the partial differential current sent by the terminal T1 may have a considerable error in it. However, at the same time this terminal T1 sends a restraint term that reflects the external fault current, feeding the trip equations with proper information to counterbalance the errors in the differential signal. Upon receiving and aligning all the partial terms each relay or terminal T1, T2, T3 calculates the total line differential and restraint currents:

$$i_{ADIF} = i_{A(T1)} + i_{A(T2)} + i_{A(T3)} = \ldots \ldots = \tag{25}$$
$$i_{CT-1(A)} + i_{CT-2(A)} + i_{CT-3(A)} + i_{CT-4(A)} + i_{CT-5(A)} + i_{CT-6(A)};$$

$$I_{ARST} = I_{AR(T1)} + I_{AR(T2)} + I_{AR(T3)} = \ldots \ldots = \tag{26}$$
$$I_{CT-1(A)} + I_{CT-2(A)} + I_{CT-3(A)} + I_{CT-4(A)} + I_{CT-5(A)} + I_{CT-6(A)};$$

(and similarly for the B and C phases)

$$I_{QRST} = I_{QR(T1)} + I_{QR(T2)} + I_{QR(T3)} = \tag{27}$$
$$\ldots \ldots = I_{1Q} + I_{2Q} + I_{3Q} + I_{4Q} + I_{5Q} + I_{6Q};$$

$$I_{GRST} = I_{GR(T1)} + I_{GR(T2)} + I_{GR(T3)} = \tag{28}$$
$$\ldots \ldots = I_{1G} + I_{2G} + I_{3G} + I_{4G} + I_{5G} + I_{6G};$$

In this way, each relay in the line current differential system derives the true value of the restraint current regardless of the location of the fault and the short circuit capacity behind any given relay. For example, the terminal T3 can be very weak feeding very little current to a fault at terminal T1. However, the terminal T3 will receive the T1 partial restraint values to counterbalance possible errors in the T1 partial differential current.

Note that the design is scalable and works with any number of local currents without the need to modify the communication package or increase the bandwidth. The other local currents can be line reactor currents, calculated line charging current, or currents of a small bus included in the line protection zone as long as the relay hardware supports extra current inputs. The line differential and restraint currents feed into generalized alpha plane trip equations, as discussed above.

It will be understood by those having skill in the art that many changes may be made to the details of the above-described embodiments without departing from the underlying principles of the invention. The scope of the present invention should, therefore, be determined only by the following claims.

The invention claimed is:

1. A method for current differential protection for a multi-terminal power apparatus that includes three or more terminals, the method comprising:
   measuring a current at each of the three or more terminals, each current having a respective amplitude and angle;
   calculating a differential current comprising a sum of the three or more measured currents;
   calculating a restraining current corresponding to the three or more measured currents;
   converting the differential current and the restraining current into a first equivalent current of an equivalent two-terminal power apparatus and a second equivalent current of the equivalent two-terminal power apparatus,
      wherein a sum of the first equivalent current and the second equivalent current substantially equals the differential current of the original multi-terminal power apparatus, and
      wherein values of the first equivalent current and the second equivalent current substantially yield the restraining current of the multi-terminal power apparatus; and
   based on the first equivalent current and the second equivalent current, selectively tripping the multi-terminal power apparatus.

2. The method of claim 1, wherein selectively tripping based on the first equivalent current and the second equivalent current comprises:
   applying an alpha plane analysis to the first equivalent current and the second equivalent current to determine whether to provide or block a trip signal.

3. The method of claim 2, further comprising:
   before converting to the first equivalent current and the second equivalent current, intentionally augmenting at least one of the differential current and the restraining current based on a physical condition of the multi-terminal power apparatus.

4. The method of claim 3, wherein augmenting at least one of the differential current and the restraining current comprises performing harmonic restraint by:
   determining a plurality of harmonics of at least one of the differential current and any of the measured currents; and
   adding the plurality of harmonics to restraint terms using selected multipliers.

5. The method of claim 3, wherein augmenting at least one of the differential current and the restraining current comprises:

decreasing the differential current in accordance with an estimated line charging current.

6. The method of claim 1, wherein calculating the restraining current comprises performing one or more calculations selected from the group comprising:
   summing absolute values of the three or more measured currents;
   selecting a maximum value of the amplitudes of the three or more measured currents; and
   producing a product of amplitudes of the three or more measured currents.

7. The method of claim 2, wherein applying the alpha plane analysis comprises:
   calculating a magnitude value of a ratio of the first equivalent current and the second equivalent current;
   calculating an angle difference value between the first equivalent current and the second equivalent current; and
   comparing the ratio magnitude value and the angle difference value against preselected values that establish a phase region in a current ratio plane,
   wherein when the ratio magnitude value and the angle difference value are outside the established region, the trip signal is allowed, and
   wherein when the ratio magnitude value and the angle difference value are within the established region, the trip signal is blocked.

8. The method of claim 7, wherein applying the alpha plane analysis further comprises:
   determining a separate alpha plane representation for at least one of phase currents, zero sequence currents, negative sequence currents, positive sequence currents, and combinations of the foregoing.

9. The method of claim 1, wherein converting the differential current and the restraining current into the first and second equivalent currents comprises:
   assigning an attribute of one of the measured currents at one of the three or more terminals to the first equivalent current; and
   calculating real and imaginary parts of the first and second equivalent currents based on the assigned attribute and the calculated differential and restraining currents.

10. The method of claim 9, wherein assigning the attribute comprises:
    assigning a magnitude of one of the measured currents as the magnitude of the first equivalent current.

11. The method of claim 9, wherein assigning the attribute comprises:
    assigning an angle of one of the measured currents as the angle of the first equivalent current.

12. The method of claim 11, wherein the assigned angle comprises an angle of one of the measured currents that produces the greatest absolute value when projected onto a line of the differential current.

13. The method of claim 12, wherein the first equivalent current is denoted $I_S$ and the second equivalent current is denoted $I_T$, wherein $$I_T = \left(\frac{\text{Im}(I_X)^2 - (I_{RN} - \text{Re}(I_X))^2}{2 \cdot (I_{RN} - \text{Re}(I_X))} + j \cdot \text{Im}(I_X)\right) \cdot 1\angle\beta,$$

and $$I_S = (I_{RN} - |I_T|) \cdot 1\angle\beta,$$

wherein $\beta$ is the assigned angle, $I_X$ is a shifted differential current produced by dividing the differential current by $1\angle\beta$, Re and Im respectively refer to the real and imaginary parts of the current $I_X$, and $I_{RN}$ is the restraining current.

14. The method of claim 1, wherein measuring the current at each terminal comprises measuring a plurality of currents at each terminal, wherein each terminal calculates a respective partial differential current comprising a sum of the plurality of currents that the terminal measured, and wherein each terminal calculates a respective partial restraint current from the values of the plurality of currents that the terminal measured, the method further comprising for each terminal:
    generating multiple samples of the partial differential current corresponding to a period of time;
    generating a partial restraint current corresponding to the same period of time; and
    transmitting the multiple samples of the partial differential current and the corresponding partial restraint current in a packet to the other terminals.

15. The method of claim 14, wherein each terminal further calculates at least one of a partial restraint phase current, a partial restraint zero sequence current, a partial restraint negative sequence current, a partial restraint positive sequence current, and a combination of the foregoing.

16. A system for current differential protection, the system comprising:
    a first terminal configured to measure a multitude of currents flowing within the first terminal;
    a second terminal configured to measure a multitude of currents flowing within the second terminal;
    a third terminal configured to measure a multitude of currents flowing within the third terminal,
       wherein at least one of the first terminal, the second terminal, and the third terminal is in communication with the other two terminals; and
    a processor configured to:
       for each of the first terminal, the second terminal, and the third terminal:
          calculate a partial differential current from the multitude of currents flowing within the particular terminal and communicate it to the other terminals; and
          calculate a partial restraining current from the multitude of currents flowing within the particular terminal and communicate it to the other terminals;
       calculate a differential current comprising a sum of the exchanged partial differential currents;
       calculate a restraining current corresponding to the exchanged partial restraining currents;
       convert the differential current and the restraining current into a first equivalent current of an equivalent two-terminal power apparatus and a second equivalent current of the equivalent two-terminal power apparatus,
          wherein a sum of the first equivalent current and the second equivalent current substantially equals the differential current calculated from the communicated currents, and
          wherein the values of the first equivalent current and the second equivalent current substantially yield the restraining current calculated from the communicated currents; and
       based on the first equivalent current and the second equivalent current, selectively trip at least one of the three terminals.

17. The system of claim 16, wherein the processor is further configured to selectively trip by applying an alpha plane analysis to the first equivalent current and the second equivalent current to determine whether to provide or block a trip signal.

18. The system of claim 17, wherein the processor is further configured to, before converting to the first equivalent current and the second equivalent current, intentionally augment at least one of the differential current and the restraining current based on a physical condition of the system.

19. The system of claim 18, wherein the processor is further configured to augment using harmonic restraint by:
determining a plurality of harmonics of one or more of the differential current and any of the measured currents; and
adding the plurality of harmonics to restraint terms using selected multipliers.

20. The system of claim 18, wherein the processor is further configured to augment by decreasing the differential current in accordance with an estimated line charging current.

21. The system of claim 16, wherein the processor is further configured to calculate the partial restraining current by performing one or more calculations selected from the group comprising, for each of the first terminal, the second terminal and the third terminal:
summing absolute values of the multitude of currents flowing within the particular terminal;
selecting a maximum value of the amplitudes of the multitude of currents flowing within the particular terminal; and
producing a product of amplitudes of the multitude of currents flowing within the particular terminal.

22. The system of claim 17, wherein the processor is further configured to apply the alpha plane analysis by:
calculating a magnitude value of a ratio of the first equivalent current and the second equivalent current;
calculating an angle difference value between the first equivalent current and the second equivalent current; and
comparing the ratio magnitude value and the angle difference value against preselected values that establish a phase region in a current ratio plane,
wherein when the ratio magnitude value and the angle difference value are outside the established region, the trip signal is allowed, and
wherein when the ratio magnitude value and the angle difference value are within the established region, the trip signal is blocked.

23. The system of claim 22, wherein the processor is further configured to apply the alpha plane analysis by:
determining a separate alpha plane representation for at least one of phase currents, zero sequence currents, negative sequence currents, positive sequence currents, and combinations of the foregoing.

24. The system of claim 16, wherein the processor is further configured to convert the differential current and the restraining current into the first and second equivalent currents by:
assigning an attribute of one of the communicated currents to the first equivalent current; and
calculating real and imaginary parts of the first and second equivalent currents based on the assigned attribute and the calculated differential and restraining currents.

25. The system of claim 24, wherein the processor is further configured to assign the attribute by:
assigning a magnitude of one of the communicated currents as the magnitude of the first equivalent current.

26. The system of claim 24, wherein the processor is further configured to assign the attribute by:
assigning an angle of one of the communicated currents as the angle of the first equivalent current.

27. The system of claim 26, wherein the assigned angle comprises an angle of one of the communicated currents that produces the greatest absolute value when projected onto a line of the differential current.

28. The system of claim 27, wherein the first equivalent current is denoted $I_S$ and the second equivalent current is denoted $I_T$, wherein $$I_T = \left( \frac{\text{Im}(I_X)^2 - (I_{RN} - \text{Re}(I_X))^2}{2 \cdot (I_{RN} - \text{Re}(I_X))} + j \cdot \text{Im}(I_X) \right) \cdot 1 \angle \beta,$$

and $$I_S = (I_{RN} - |I_T|) \cdot 1 \angle \beta,$$

wherein $\beta$ is the assigned angle, $I_X$ is a shifted differential current produced by dividing the differential current by $1 \angle \beta$, Re and Im respectively refer to the real and imaginary parts of the current $I_X$, and $I_{RN}$ is the restraining current.

29. A system for current differential protection for a multi-terminal power apparatus that includes three or more terminals, the system comprising:
means for measuring a current at each of the three or more terminals, each current having a respective amplitude and angle;
means for calculating a differential current comprising a sum of the three or more measured currents;
means for calculating a restraining current corresponding to the three or more measured currents;
means for converting the differential current and the restraining current into a first equivalent current of an equivalent two-terminal power apparatus and a second equivalent current of the equivalent two-terminal power apparatus,
wherein a sum of the first equivalent current and the second equivalent current substantially equals the differential current of the original multi-terminal power apparatus, and
wherein the values of the first equivalent current and the second equivalent current substantially yield the restraining current of the multi-terminal power apparatus; and
means for selectively tripping the multi-terminal power apparatus based on the first equivalent current and the second equivalent current.

* * * * *